(12) United States Patent
Grove et al.

(10) Patent No.: US 11,028,584 B2
(45) Date of Patent: *Jun. 8, 2021

(54) CONNECTION APPARATUS AND METHOD

(71) Applicant: Christie Lites Enterprises Canada Inc., Ontorio (CA)

(72) Inventors: Michael Grove, Orlando, FL (US); Huntly Gordon Christie, Orlando, FL (US)

(73) Assignee: Christie Lites Enterprises Canada Inc., Ontorio (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,664

(22) Filed: Mar. 6, 2020

(65) Prior Publication Data
US 2020/0208402 A1 Jul. 2, 2020

Related U.S. Application Data

(63) Continuation of application No. 16/249,552, filed on Jan. 16, 2019, now Pat. No. 10,619,350.

(30) Foreign Application Priority Data

Apr. 18, 2018 (CA) .................................. CA 3002006

(51) Int. Cl.
*E04C 3/02* (2006.01)
*F16B 33/00* (2006.01)
*F16B 35/00* (2006.01)

(52) U.S. Cl.
CPC .............. *E04C 3/02* (2013.01); *F16B 33/002* (2013.01); *F16B 35/00* (2013.01)

(58) Field of Classification Search
CPC ............ E04C 3/02; F16B 35/00; F16B 33/002
See application file for complete search history.

(56) References Cited

U.S. PATENT DOCUMENTS

| 134,963 A | 1/1873 | Wingate |
| 1,649,071 A | 11/1927 | Lowe |
| 3,263,728 A | 8/1966 | Lynch |
| 4,915,557 A | 4/1990 | Stafford |
| 4,941,789 A | 7/1990 | Sims |

(Continued)

FOREIGN PATENT DOCUMENTS

EP 15443792 6/2005

*Primary Examiner* — Patrick J Maestri
(74) *Attorney, Agent, or Firm* — DLA Piper LLP (US)

(57) ABSTRACT

A connection apparatus for attaching a first truss to a second truss has first and second connection segments, a bolt and an optional spring. The first connection segment has an aperture dimensioned to receive a threaded end and shank of the bolt. The aperture is also dimensioned to prevent the head end of the bolt and the threaded end from passing through. The aperture comprising a recess for receiving the second end of the spring. The first connection segment has a side opening, open to the aperture, dimensioned to receive the shank of the bolt. The first connection segment has a shoulder portion within the aperture dimensioned to closely fit around the shank and prevent the threaded end of the bolt from passing therethrough. The second connection segment for attaching to the second truss has a threaded hole dimensioned to fixably receive the threaded end of the bolt.

12 Claims, 11 Drawing Sheets

(56) References Cited

U.S. PATENT DOCUMENTS

| | | | |
|---|---|---|---|
| 4,974,888 A | 12/1990 | Childers | |
| 5,040,917 A | 8/1991 | Camuffo | |
| 5,197,817 A | 3/1993 | Wood et al. | |
| 5,743,692 A | 4/1998 | Schwarz | |
| 5,855,463 A | 1/1999 | Newby | |
| 6,027,294 A | 2/2000 | Newby | |
| 6,678,874 B1 | 1/2004 | Jochym et al. | |
| 6,761,521 B2 | 7/2004 | McCormack et al. | |
| 7,938,607 B2 | 5/2011 | Wang | |
| 8,087,861 B2 | 1/2012 | Wang | |
| 8,132,767 B2 | 3/2012 | Oh et al. | |
| 9,080,655 B2 | 7/2015 | Cronin et al. | |
| 10,087,615 B1 * | 10/2018 | Christie | E04C 3/04 |
| 10,167,634 B2 * | 1/2019 | Christie | F16B 2/065 |
| 10,411,454 B2 | 9/2019 | Bundren et al. | |
| 2011/0133451 A1 | 6/2011 | Singh et al. | |
| 2014/0086703 A1 | 3/2014 | Thommes | |
| 2014/0147228 A1 | 5/2014 | Kobayashi | |
| 2015/0071730 A1 | 3/2015 | Tseng | |
| 2018/0272514 A1 | 9/2018 | Pergantis et al. | |
| 2019/0055971 A1 | 2/2019 | Maloney et al. | |

* cited by examiner

CONNECTION APPARATUS AND METHOD

CROSS REFERENCE TO RELATED APPLICATIONS

This application is a continuation of U.S. patent application Ser. No. 16/249,552, filed Jan. 16, 2019, which claims priority from Canadian Patent Application No. 3,002,006, filed Apr. 18, 2018, the entireties of both applications are incorporated herein by reference.

FIELD OF TECHNOLOGY

The present disclosure generally relates to an apparatus and method for connecting truss sections to provide a single truss structure.

BACKGROUND

Connection apparatus may be used in a variety of applications and industries. In one application, connection apparatus may be used to interconnect truss sections. Truss sections are used in a variety of industries, including the entertainment industry, where they are used for the construction of truss structures for mounting lighting, cameras, displays, and speaker systems. Truss structures are commonly used in entertainment (and in particular concert) or trade show venues for this purpose. Each time they are used, truss structures are assembled from individual truss sections. Once a concert, festival, or trade show has concluded the truss structures are disassembled and the truss sections are transported to other venues or to storage facilities.

Although some means are needed to secure lighting, sound, camera, and display equipment for concerts, not all entertainment venues are equipped with such means. Accordingly, in some cases truss sections are transported to the venue and a truss structure is assembled on site. Because renting of a venue is costly, it is desirable for truss structures to be assembled and disassembled quickly to minimize rental costs. Assembling such a truss structure can be large and complex job.

Truss structures are typically constructed by placing truss sections adjacent to one another and joining them together. In order to form a single unitary whole, each truss section comes equipped with a mechanism by which it may be connected to other truss assemblies. The connecting mechanism comprises a set of connection openings that may be aligned as between separate truss assemblies and through which connection hardware, such as pins or threaded bolts, may be inserted to create firm connection points.

Truss sections are normally shipped out to venues from a central storage facility or possibly from a number of disparate storage facilities. Connection hardware must be present at the venue in order for the truss sections to be assembled.

The connection hardware and fasteners are quite small as compared to the truss sections and as a result may be stored separately from the truss sections. Alternatively, the disassembler may choose to reattach the connection hardware to the truss for storage by reinserting the connection hardware into the connection opening of a truss section after disassembly. Where a truss structure has many connections, reinserting the connection hardware can significantly increase disassembly time.

When reinserting the connection hardware, the disassembler may decide to attach the connection hardware to either one of the two truss sections. This may lead to an inconsistency in how the connection hardware is stored with respect to the truss sections. This inconsistency is exacerbated by the fact that sometimes truss sections will be connected to other sections at both ends or other locations and sometimes there will only be a connection at one end.

The inconsistency in the storage of the connection hardware creates a possible problem wherein there is a chance or likelihood that truss sections being delivered to a venue may not arrive with the appropriate connection hardware. The lack of appropriate connection hardware may not be discovered until the truss sections arrive at the venue, leading to a delay and increase in the time required to assemble the truss structure.

BRIEF DESCRIPTION OF THE DRAWINGS

The following drawings illustrate examples of the components, and are for illustrative purposes only. Other embodiments that are substantially similar can use other components that have a different appearance.

DETAILED DESCRIPTION

The present disclosure relates to a truss connection apparatus to allow efficient assembly of truss structures.

A connection apparatus for attaching a first truss to a second truss is described. The connection apparatus comprises a bolt, a spring and a first connection segment and a second connection segment. The bolt comprises a threaded end, a head end opposite the threaded end; and a shank between the head end and the threaded end. The coil spring has a hollow portion for receiving the threaded end and the shank of bolt, wherein the spring is dimensioned to prevent the head end of fastener from passing through the hollow portion, and wherein the spring comprises a first end for engaging the head end of the bolt and a second end. The first connection segment for attaching to the first truss has an aperture dimensioned to receive the threaded end and the shank of the bolt, the aperture being dimensioned to prevent the head end of the bolt and the threaded end from passing through, and the aperture comprising a recess for receiving the second end of the spring. The first connection segment also has a side opening, open to the aperture, dimensioned to receive the shank of the bolt. The first connection segment also has a shoulder portion within the aperture dimensioned to closely fit around the shank of the bolt and prevent the threaded end of the bolt from passing therethrough. When the threaded end and the shank of the bolt is positioned within the hollow portion of the spring and the second end of the spring is positioned within the recess of the first connection segment, the bolt and spring are restricted form axial movement relative to the first connection segment by engagement of the first end of the spring with the head end of the bolt and the second end of the spring with the recess of the first connection segment, the bolt and spring are further restricted from lateral movement relative to the first connection segment by engagement of the second end of the spring with the recess of the first connection segment. The second connection segment for attaching to the second truss has a threaded hole dimensioned to fixably receive the threaded end of the bolt.

Figure 1:
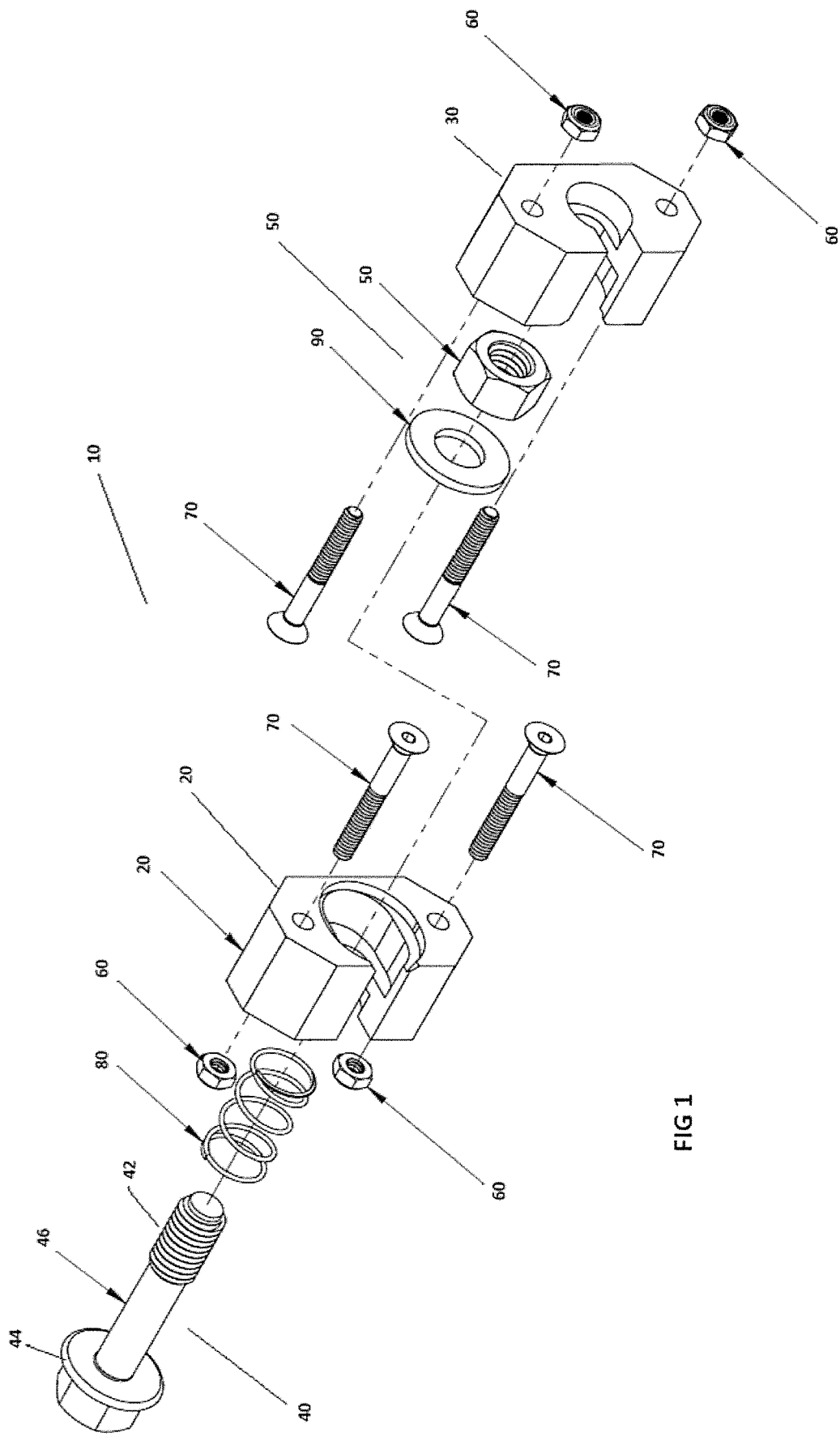
FIG. 1 is an exploded isometric view of an embodiment of a connection apparatus comprising a first connection segment and a second connection segment.

Reference will now be made to FIG. 1, which provides an exploded isometric view of an embodiment of a connection apparatus 10. Connection apparatus 10 comprises a first connection segment 20, a second connection segment 30, a first fastener 40, and a second fastener 50. In this embodiment, first fastener 40 is a threaded fastener with an external male thread (e.g., a bolt) and second fastener 50 (e.g., a nut) has a threaded hole for receiving the first fastener. Bolt 40 comprises a threaded portion 42, a shank 46, and a bolt head 44. In the embodiment referenced in FIG. 1, the first connection segment 20 may be fastened to a first truss which is to be joined with a second truss. The first connection segment 20 may be fastened to the first object using paired fasteners 60 and 70. In the embodiment shown in FIG. 1, fastener 60 is a nut and fastener 70 is a bolt. A plurality of fasteners 60, 70 may be used, such as using two such pairs of fasteners, as referenced in FIG. 1. Other means of fastening the first connection segment to an truss may be used, such as self-tapping screws, or machine screws in tapped holes, welding, or adhesive. As described in more detail, the bolt and nut are held captive by the first and second segments being fastened to the truss. In a further embodiment, the first connection segment 20 may be integral with the first truss, or built into the body of the first object.

The second connection segment 30 may similarly be fastened to the second truss using fasteners 60 and 70. Other means may be used to fasten the second connection segment 30 with the second truss. In a further embodiment, the second connection segment 30 may be integral with the second truss, or built into the body of the second object. In still a further embodiment, the first and second objects may be two parts of the same truss. Nut 50 comprises a threaded hole for receiving the bolt 40.

Although the present disclosure is not limited to any one particular use, it will refer to interconnecting truss structures.

Figure 4A:
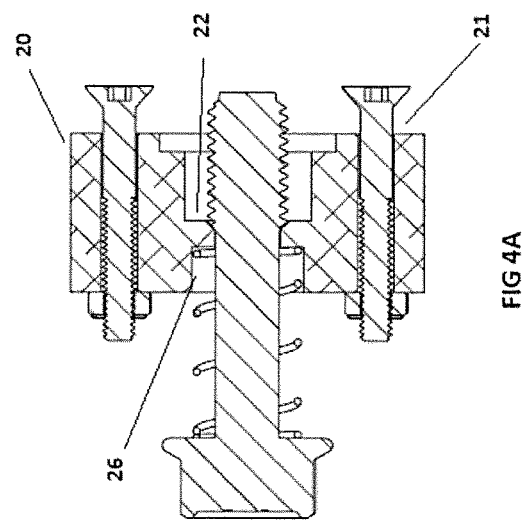
FIG. 4A is a side sectional view of the first connection segment of FIG. 2A.
Figure 3A:
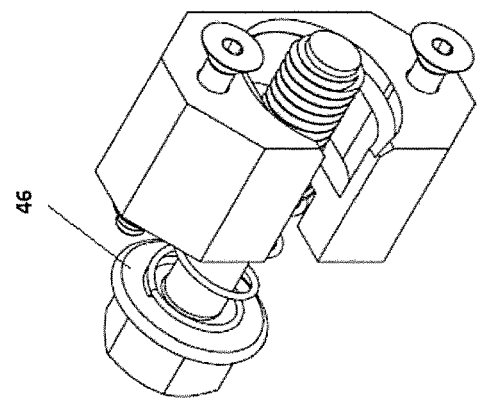
FIG. 3A is a different isometric view of the first connection segment of FIG. 2A.
Figure 2A:
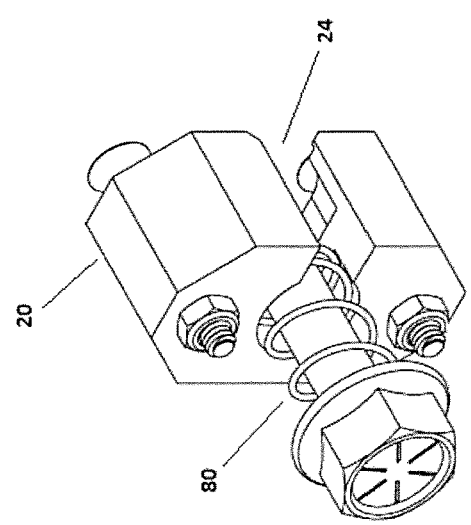
FIG. 2A is an isometric view of the first connection segment of FIG. 1 with the spring in an uncompressed state.

Reference will now be made to FIGS. 2A, 3A, and 4A which respectively provide isometric and side views of a first connection segment 20, bolt 40, spring 80, and fasteners 60 and 70 when the spring is expanded. First connection segment 20 comprises an opening 24 (FIG. 2A). The opening comprises a narrower portion 22, or shoulder (shown in FIG. 4A) which is dimensioned to closely fit around the shank 46 of bolt 40. The threaded portion 42 and bolt head 44 of bolt 40 are wider in diameter than the shank 46 and the width of the narrower portion 22 of the first connection segment 20. As such, the bolt 40 may be placed into the opening 24 by first aligning the shank 46 with the narrower portion 22 and sliding, in a direction perpendicular to the bolt axis, the bolt 40 into the opening 24. Once the bolt 40 is inside the opening 24, the bolt has a limited range of axial movement within the opening as the narrower portion 22 is narrower than both the threaded portion 42 and bolt head 44 of bolt 40.

A spring 80 may be provided to secure the bolt 40 within the body of the first connection segment 20 by biasing the bolt axially towards to head of the bolt 44. The spring 80 may also reduce the movement of the bolt 40 such as rattling during movement and bias the bolt 40 within the first connection segment so the shaft of the bolt is less likely to protrude from the truss and interfere with placement of the truss during transport, storage and assembly. The spring is optional but will be included in the description of the embodiment.

In operation, one end of the spring 80 abuts against the bolt head 44. The other end of the spring 80 is biased against a lip formed by the narrower portion 22 of the first connection segment. The spring 80 thus limits the bolt 40 from axial movement relative to the first connections segment 20. As previously mentioned, the first connection segment may be integral with or built into the object to be attached.

When it its biased expanded stated, the spring 80 also restricts the bolt 40 from side-to-side movement. The spring 80 is coil spring wrapped around the bolt 40. The first connection segment 20 comprises a recess 26 (referenced in FIG. 4A) for receiving the spring 80. The diameter of the recess 26 is dimensioned to contain the spring 80 and restrict side-to-side movement when the spring 80 is within the recess 26. In this embodiment, the recess 26 is slightly larger in diameter than the spring 80. Accordingly, when the bolt 40 and the expanded spring 80 are both captured by the first connection element 20 (shown in FIG. 2A), both the bolt and spring are prevented from axial and side-to-side movement of the bolt 40 relative to the first connection element 20.

In this embodiment, the bolt 40 may be dimensioned such that a portion of the threaded portion 42 of the bolt 40 is exposed (referenced in FIG. 4A) and extends externally from the body of the first connection segment 20.

To remove the bolt 40 from the first connection segment 20, the bolt and spring may be manually manipulated. FIGS. 2C, 3C, and 4C illustrate the bolt 40, spring 80, and first connection segment 20 where the spring 80 is compressed and the bolt head 44 is spaced apart from the first connection segment 20 when manually manipulated. As referenced in FIG. 4C, when the spring 80 is compressed manually and the bolt head 44 is spaced apart from the first connection segment 20, the spring 80 is outside the recess 26 of the first connection segment 20. In this orientation, spring 80 and bolt 40 are able to move side-to-side (i.e., perpendicular to the axis of bolt 40), and the threaded portion 40 is clear of the first connection segment, accordingly, bolt 40 may be removed from the first connection segment by sliding the bolt out of the side opening 24 of the first connection segment 20. When the spring is manually manipulated, the bolt may be removed, replaced or installed in this manner.

Figure 4B:
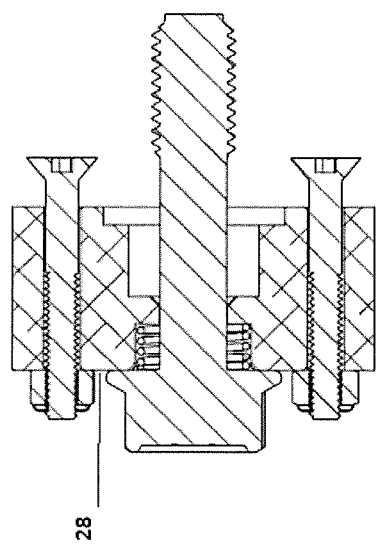
FIG. 4B is a side sectional view of the first connection segment of FIG. 2B.
Figure 3B:
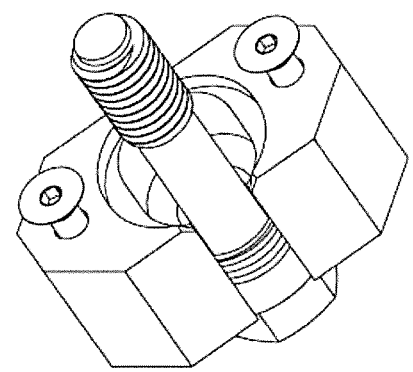
FIG. 3B is a different isometric view of the first connection segment of FIG. 2B.
Figure 2B:
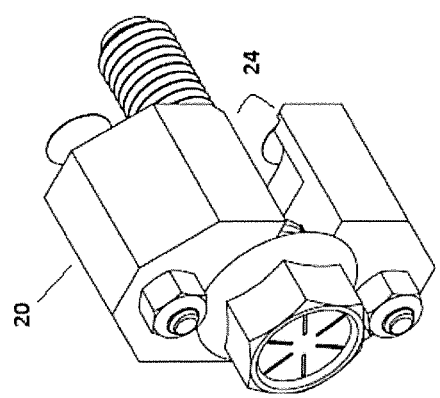
FIG. 2B is an isometric view of the first connection segment of FIG. 1 with the spring in a fully compressed state and the bolt head being flush with the surface of the connection segment.
Figure 4C:
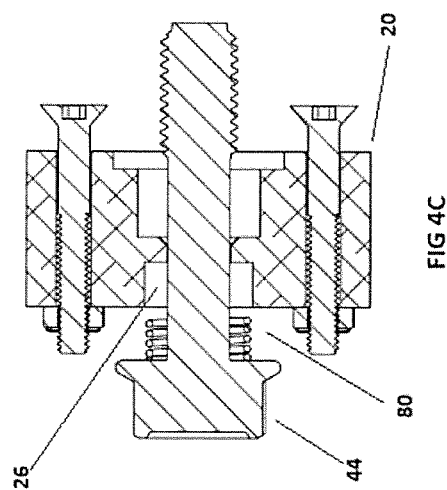
FIG. 4C is a side sectional view of the first connection segment of FIG. 2C.
Figure 3C:
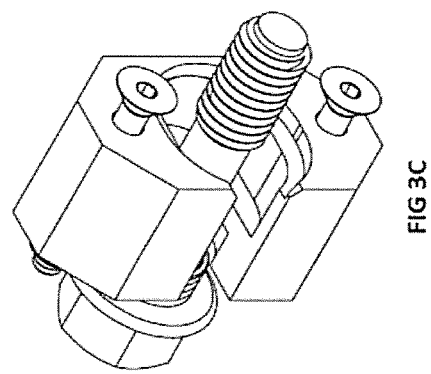
FIG. 3C is a different isometric view of the first connection segment of FIG. 2C.
Figure 2C:
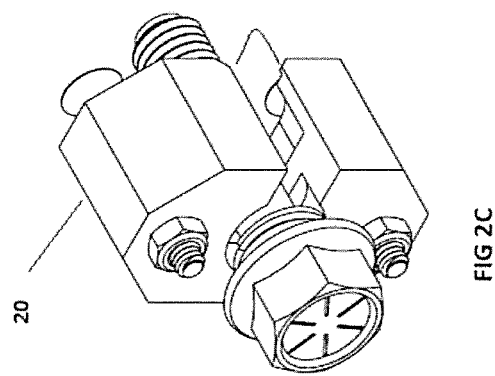
FIG. 2C is an isometric view of the first connection segment of FIG. 1 with the spring in a fully compressed state and the bolt head being spaced apart from the surface of the connection segment.

FIGS. 2B, 3B, and 4B illustrate the relative orientation of the bolt 40, spring 80, and first connection segment 20 when the bolt 40 abuts the surface 28 of the first connection segment 20, such as when the bolt (and nut, not shown in FIGS. 2B, 3B and 4B) are tightened and the bolt is fastening the first truss with the second truss. In this orientation, the spring 80 is compressed within the recess 26 of the first connection segment 20 and restricts the bolt 40 from side to side movement relative to the first connection segment 20. Accordingly, so long as a portion of the spring 80 is within recess 26 of the first connection segment, the spring 80 and bolt 40 are restricted from side to side movement. To allow the bolt 40 to be removed from the first connection segment via the side opening 24, the spring 80 must be manipulated such that it is outside of the recess 26.

Figure 7:
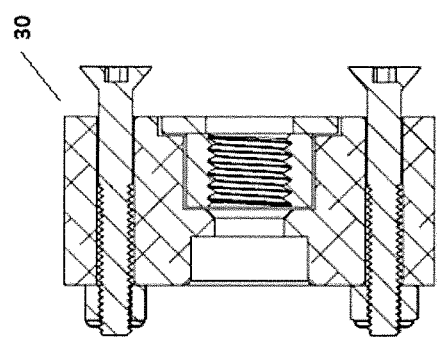
FIG. 7 is a side sectional view of the second connection segment of FIG. 5.
Figure 6:
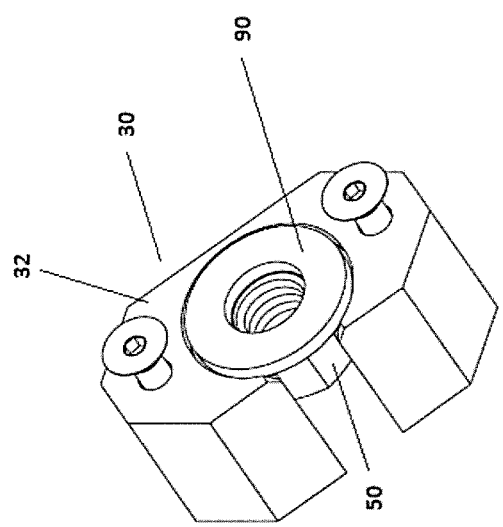
FIG. 6 is a different isometric view of the second connection segment of FIG. 5.
Figure 5:
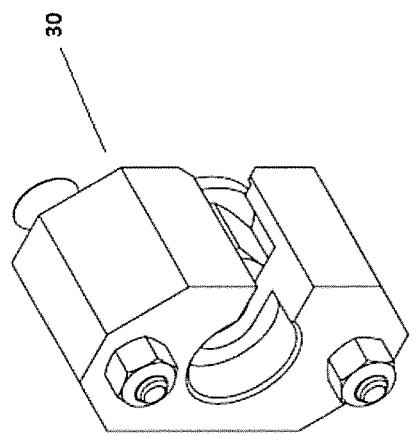
FIG. 5 is an isometric view of the second connection segment.

FIGS. 5, 6, and 7 illustrate an embodiment of the second connection segment 30. Second connection segment comprises a recess for receiving the nut 50 and washer 90. The nut 50 comprises a threaded hole for receiving a corresponding fastener, such as bolt 40. In this embodiment, the recess is dimensioned to receive the nut 50 and washer 90, such that the washer is flush with the bottom surface 32 of the second connection segment (see FIG. 7). As previously mentioned, the second connection segment 30 may be integral with or built into a truss to be attached to a first connection segment 20. The recess receives the nut 50 and constrains the nut from rotating making the nut a captive nut, particularly when the second connection segment is fixed to the second truss.

Figure 8:
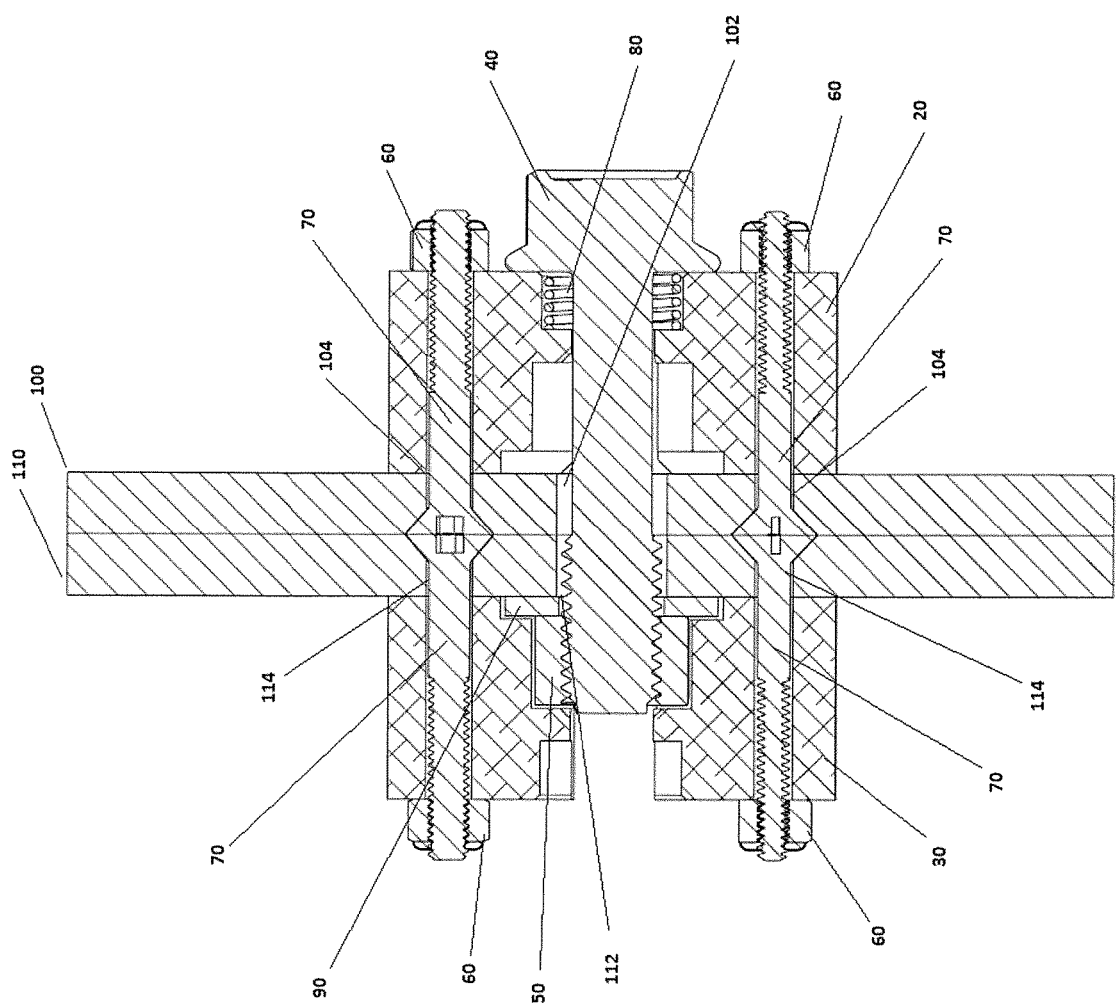
FIG. 8 is a side sectional view of the first connection segment of FIG. 2A and the second connection segment of FIG. 5 interconnected by a fastener.

FIG. 8 illustrates a side sectional view of the embodiment shown in FIG. 1 is it would appear when the first connection segment 20 and the second connection segment 30 are used to attach a first truss 100 and a second truss 110. In this embodiment, first truss 100 and second truss 110 each respectively comprise a pair of holes (104 and 114) for fasteners 60 and 70 and a bolt hole (102 and 112) for bolt 40. The first connection segment 20 and second connection segment 30 are respectively attached to a first truss 100 and second truss 110 using fasteners 60 and 70.

Before the first connection segment 20 is attached to the first object 100, the bolt 40 and spring 80 are installed with the first connection segment. After the first connection segment 20 is attached to the first truss 100, a part of the threaded portion 42 of bolt 40 may protrude from the surface of first object truss. This may be used to help with aligning the first truss 100 and second truss 110 for attachment. In this embodiment, once the first connection segment 20 is attached to the first truss 100, the bolt 40 and spring 80 may not be removed, except by removing the entire first connection segment 20 from the first truss 100. In this way the bolt is prevented from being separated from the first truss 100. In other embodiments (not shown), the first truss 100 may comprise an opening which would allow the bolt 40 and spring 80 to be removed through the manual manipulation discussed above.

Before the second connection segment 30 is attached to the second object 110, the nut 50 and washer 90 are placed in the recess of the second connection segment. Once the second connection segment 30 is attached, the nut 50 and washer 90 are captured by the surface of the second object 110 and the recess thereby preventing those components from being separated from the assembly.

Once the first connection segment 20 and second connection segment 30 are attached to their respective objects, all of the components of the connection apparatus 10 are captured with the objects. This prevents the components (such as nuts, bolts, fasteners, and springs) from being lost while the trusses are being transported, stored, assembled or disassembled. Providing all of the assembly hardware needed for assembly of the truss structure with the truss sections themselves may prevent components from being lost. Additionally, there may be a reduction in the time needed to assemble the trusses because the connection hardware does not need to be separately identified and provided. There is also reduced risk that truss sections are transported to the venue with insufficient assembly hardware to assemble the truss structure.

In the embodiments illustrated in FIG. 1-8, first connection segment 20 and second connection segment 30 are identical. Making the first and second connection segments identical simplifies the tooling and manufacturing required to produce the connection apparatus as well as simplify installing of the first and second segments on trusses with their captured nuts and bolts. Other embodiments may comprise first and second connections segments which are not identical.

To attach the first object 100 to the second object 110, the respective bolt holes 102 and 112 are lined up and the first object 100 and second object 110 are brought close to one another. By aligning the respective bolt holes 102 and 112 of the first object 100 and second object 110, the threaded hole of nut 50 and the bolt 40 should be aligned thus allowing the bolt 40 to be threaded to the nut 50. The bolt 40 may be tightened using an appropriate driver, such as a wrench. As the bolt 40 is tightened, spring 80 is compressed. As nut 50 is captured by second connection segment 30 and unable to rotate, a second wrench is not required, and the trusses may be fastened together using only a single wrench.

Figure 9:
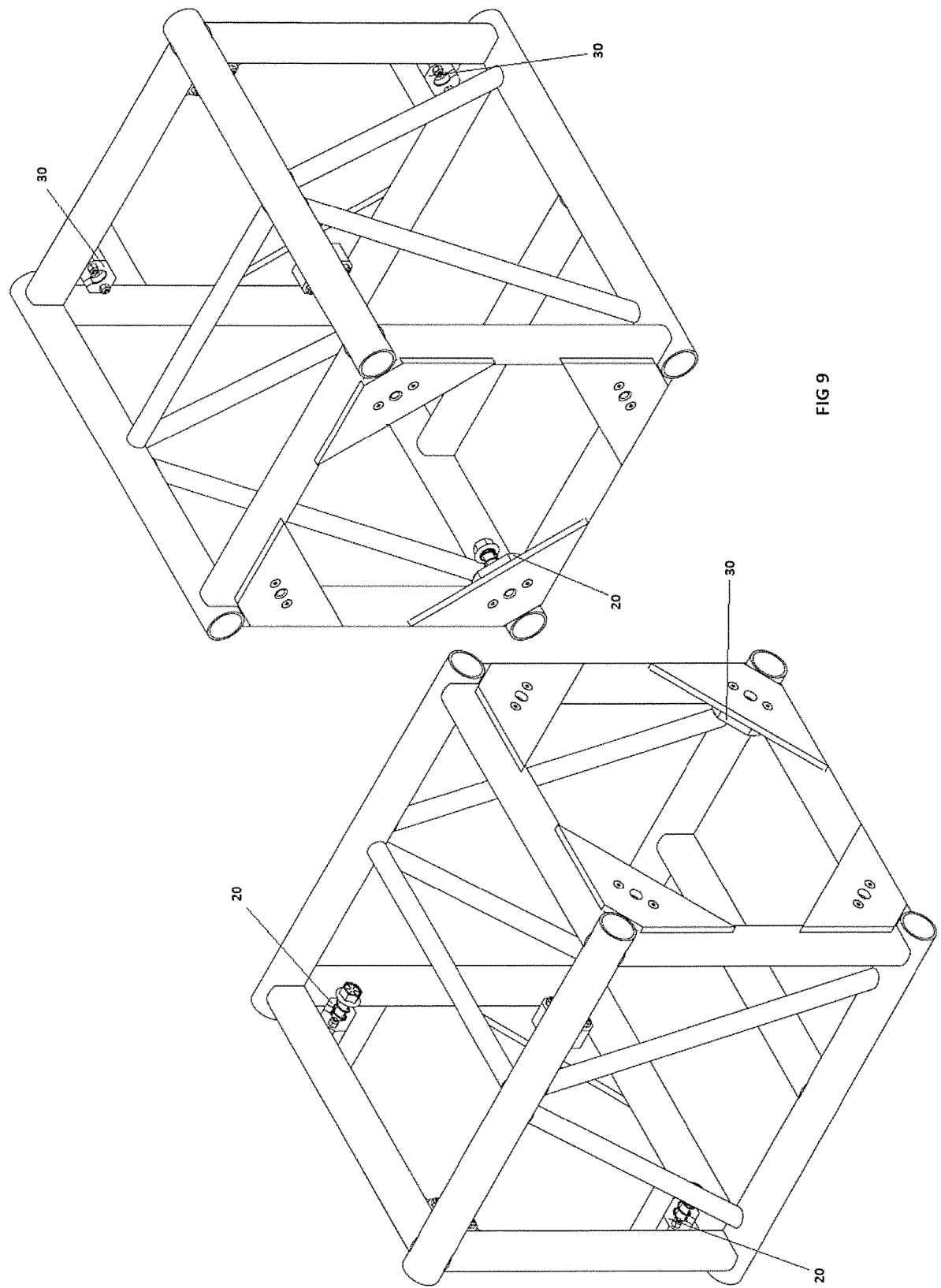
FIG. 9 is an isometric view of portions of truss sections comprising first connection segments and second connection segments attached thereto.
Figure 10:
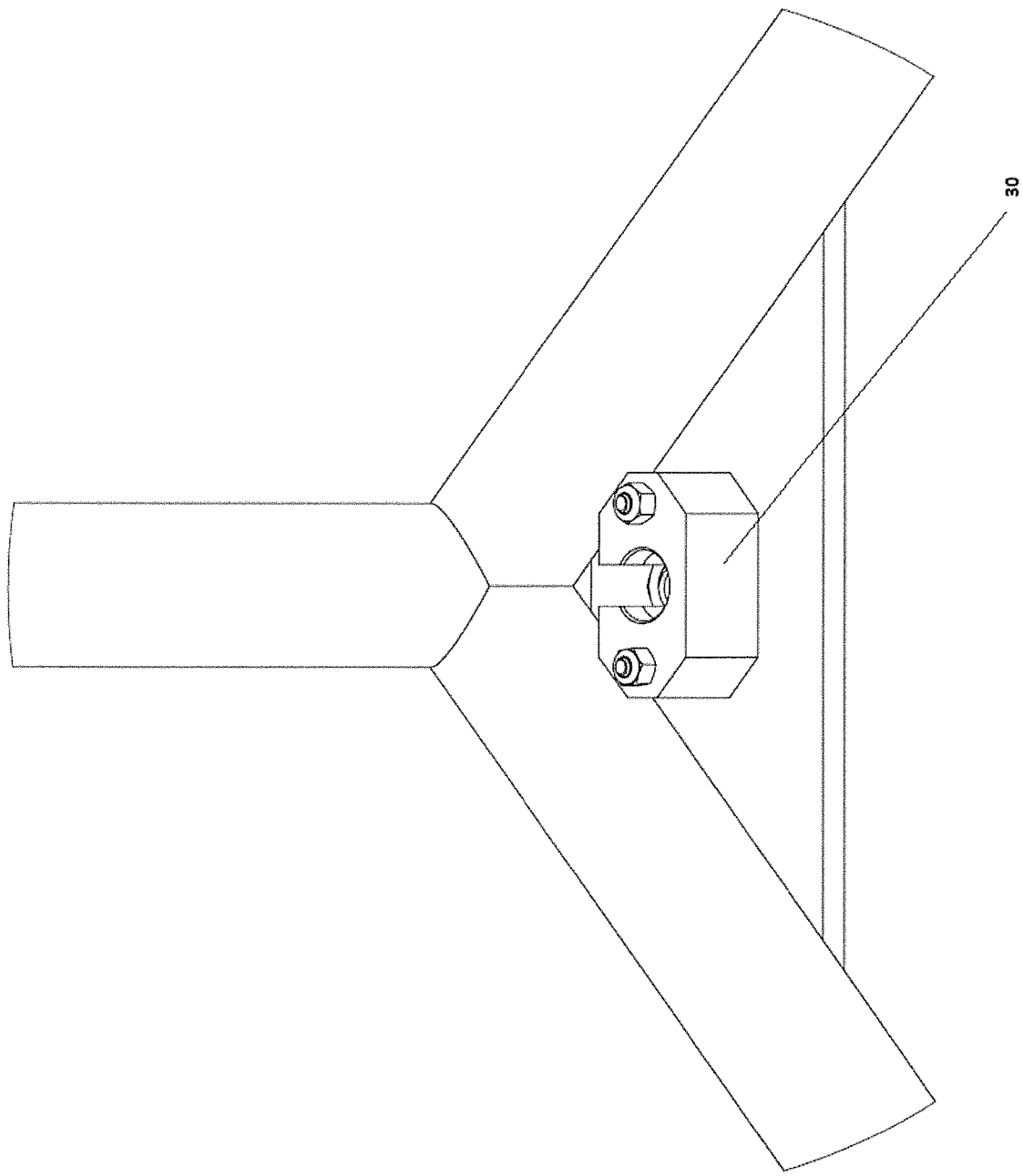
FIG. 10 is an isometric view of a portion of a truss section comprising a first connection segment attached thereto.
Figure 11:
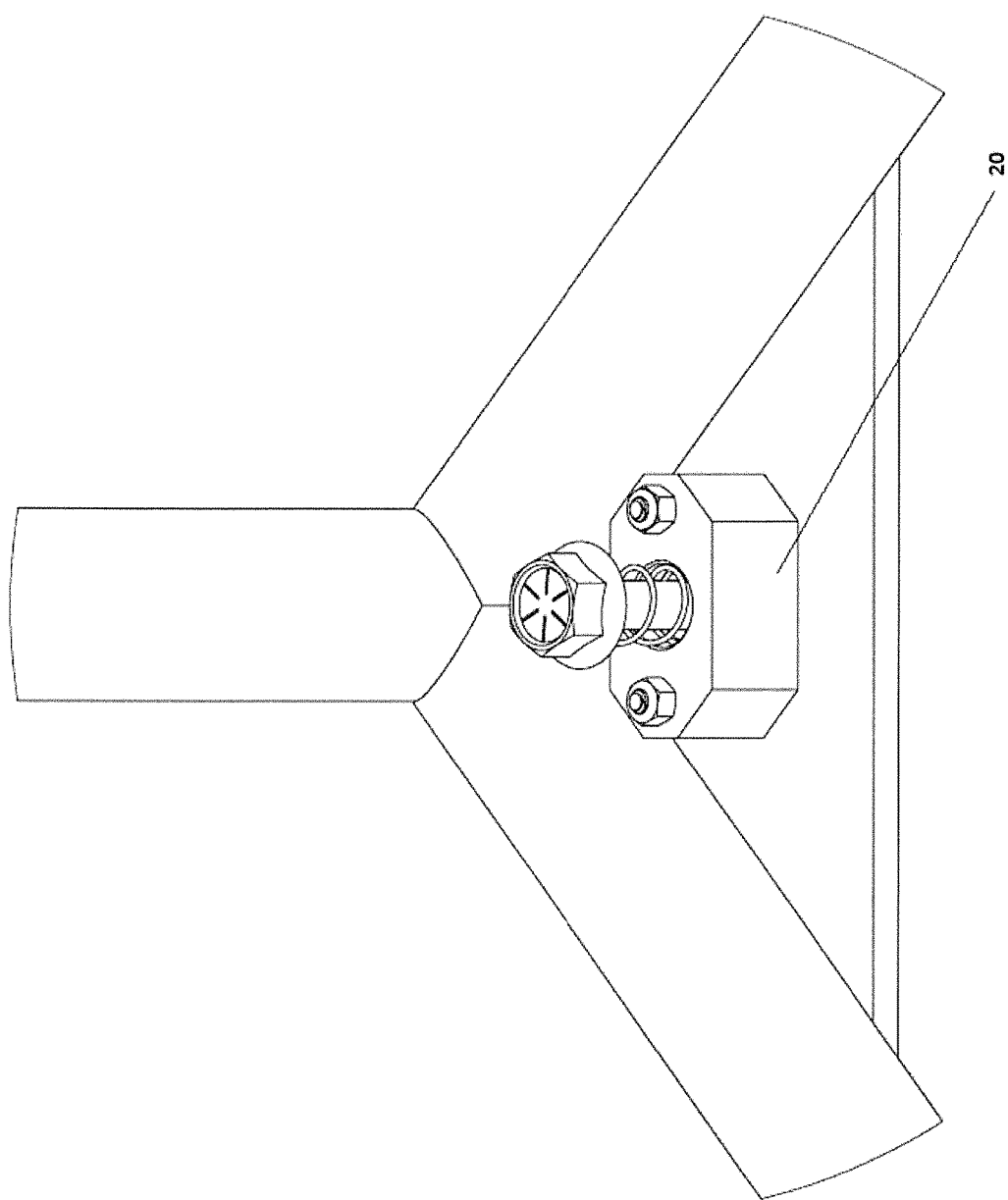
FIG. 11 is an isometric view of the truss section and first connection segment illustrated in FIG. 10, further comprising a fastener and a spring.

Each truss may be provided with one or more connection segments. FIG. 9 illustrates a plurality of first and second connection segments (20 and 30) which are attached to a pair of truss sections. In this embodiment, each end of a truss section comprises four connection segments. First connection segments 20 are provided on one end of the truss section, while second connection segments 30 are provided on the other end of the truss section. FIG. 10 illustrates a second connection segment 30 attached to a truss section. FIG. 11 illustrates a first connection segment 20 attached to a truss section.

Figure 14:
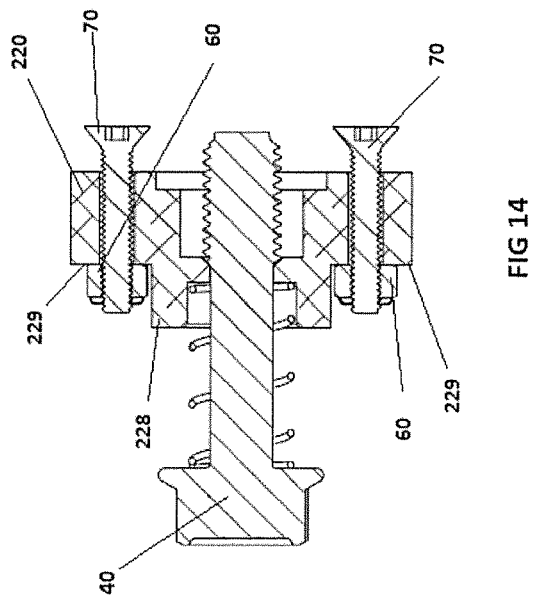
FIG. 14 is a side sectional view of the first connection segment of FIG. 12.
Figure 13:
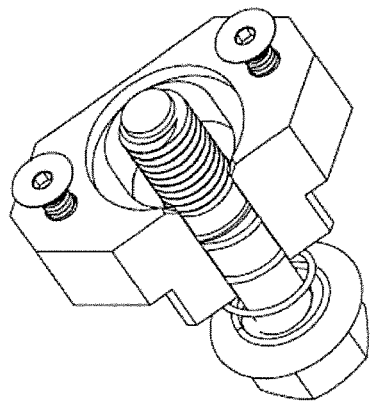
FIG. 13 is a different view of the first connection segment of FIG. 12.
Figure 12:
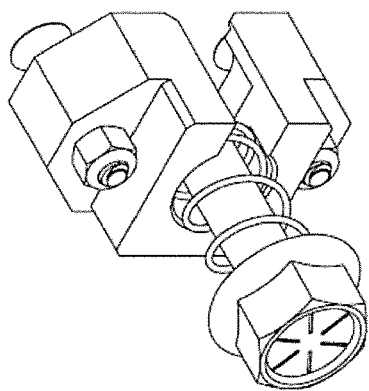
FIG. 12 is an isometric view of a further embodiment of a first connection segment.

With reference to FIGS. 12, 13 and 14, an embodiment of the first connection segment 220 may comprise depressions 229 to either side of the hole through which bolt 40 passes. With reference to FIG. 14, the surface 228 of the first connection segment 220 which abuts the head of the nut 44 when the nut is tightened is spaced apart and elevated from the depressions 229, with reference to the truss on which the segment is fixed. Nuts 60 or other means 70 of fastening the connection segment to the truss may be contained within the depression 229. During tightening of the bolt 40, the difference in elevation allows bolt 40 to be tightened without the fasteners 60 potentially getting in the way of the tools being used the tighten the bolt 40.

Figure 17:
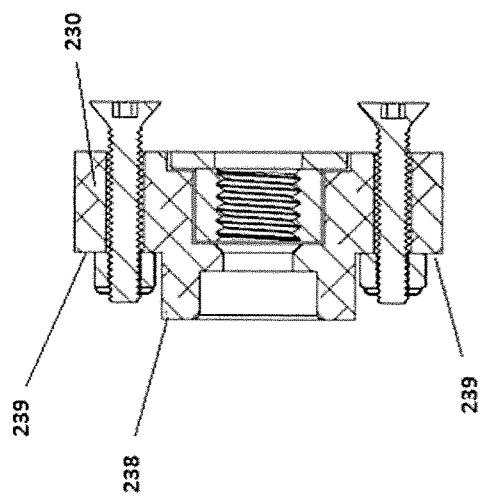
FIG. 17 is a side sectional view of the second connection segment of FIG. 15.
Figure 16:
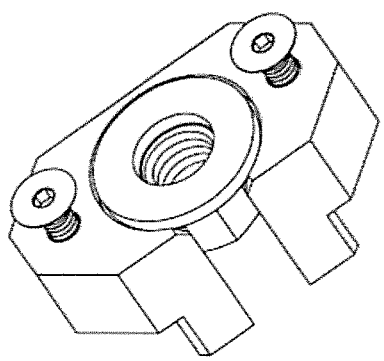
FIG. 16 is a further isometric view of the second connection segment of FIG. 15.
Figure 15:
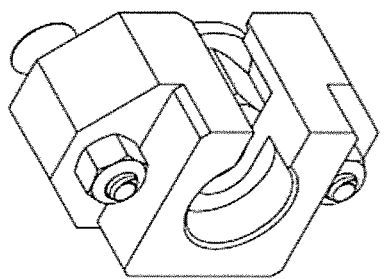
FIG. 15 is an isometric view of a further embodiment of a second connection segment.

With reference to FIGS. 15, 16 and 17, the same embodiment may be used as a second connection segment with a captured nut Similar to the further embodiment of the first connection segment 220, second connection segment 230 comprise depressions 239 and an elevated surface 238. Nuts 60 or other means 70 of fastening the connection segment to the truss may be contained within the depression 229.

Although embodiments have been described above and are illustrated in the accompanying drawings in order to be more clearly understood, the above description is made by way of example and is not meant to limit the scope of the present disclosure. It is contemplated that various modifications apparent to one of ordinary skill in the art could be made without departing from the scope of the disclosure which is to be determined by the following claims.

The invention claimed is:

1. A connection apparatus to attach a first object having a first back surface and a first attachment surface to a second object having a second back surface and a second attachment surface, the connection apparatus comprising:
   a first connection segment to mount on the first back surface, wherein the first connection segment includes an aperture;
   a second connection segment to mount on the second back surface; and
   a fastener retained by the aperture of the first connection segment, wherein the fastener is to engage the second connection segment to mate the first attachment surface with the second attachment surface,
   wherein the fastener is a bolt, the bolt including a head, a threaded end, and a shank between the head and the threaded end, and
   wherein the aperture is dimensioned to be larger than the shank and smaller than the head and the threaded end.

2. The connection apparatus of claim 1, wherein the second connection segment includes a threaded hole to receive the threaded end of the bolt.

3. The connection apparatus of claim 2, further comprising a spring disposed between the head of the bolt and the first connection segment to urge the bolt away from the second connection segment to reduce rattling when the fastener is disengaged from the second connection segment.

4. The connection apparatus of claim 1, wherein the second connection segment comprises a recess to receive a nut, wherein the nut is to be retained between the second connection segment and the second back surface.

5. The connection apparatus of claim 4, wherein the recess dimensioned to prevent rotation of the nut.

6. A truss section comprising:
   a first attachment plate disposed at a first end of the truss section, the first attachment plate having a first back surface and a first attachment surface, wherein the first attachment surface is to attach to an external attachment plate;
   a first connection segment mounted on the first back surface, wherein the first connection segment includes an aperture; and
   a truss fastener retained by the aperture of the first connection segment, wherein the truss fastener is to engage the external attachment plate to attach the first attachment plate to the external attachment plate,
   wherein the truss fastener is a bolt, the bolt including a head, a threaded end, and a shank between the head and the threaded end, and
   wherein the aperture is dimensioned to be larger than the shank and smaller than the head and the threaded end.

7. The truss section of claim 6, further comprising a second attachment plate disposed at a second end of the truss section, the second end opposite the first end, the second attachment plate having a second back surface and a second attachment surface to attach to an additional attachment plate, wherein the second attachment plate is structurally identical to the external attachment plate.

8. The truss section of claim 7, further comprising a second connection segment mounted on the second back surface, wherein the second connection segment is to engage with a fastener retained by the additional attachment plate to mate the second attachment plate with the additional attachment plate.

9. The truss section of claim 8, wherein the second connection segment includes a threaded hole to receive the threaded end of the bolt.

10. The truss section of claim 9, further comprising a spring disposed between the head of the bolt and the first connection segment to reduce rattling when the fastener is disengaged from the external attachment plate.

11. The truss section of claim 10, wherein the second connection segment comprises a recess to receive a nut, wherein the nut is to be retained between the second connection segment and the second attachment plate.

12. The truss section of claim 11, wherein the recess dimensioned to prevent rotation of the nut.

* * * * *